(12) United States Patent
Nakamura

(10) Patent No.: US 7,754,319 B2
(45) Date of Patent: Jul. 13, 2010

(54) COMPOSITE MATERIAL AND PRODUCING METHOD THEREFOR

(75) Inventor: Takeshi Nakamura, Tokyo (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 95 days.

(21) Appl. No.: 10/585,289

(22) PCT Filed: Dec. 27, 2004

(86) PCT No.: PCT/JP2004/019518

§ 371 (c)(1),
(2), (4) Date: Jul. 7, 2006

(87) PCT Pub. No.: WO2005/066098

PCT Pub. Date: Jul. 21, 2005

(65) Prior Publication Data

US 2007/0166525 A1    Jul. 19, 2007

(30) Foreign Application Priority Data

Jan. 8, 2004    (JP) .............................. 2004-002904

(51) Int. Cl.
*B32B 3/06*    (2006.01)
*B32B 15/04*    (2006.01)
*B32B 17/12*    (2006.01)
*D04H 1/00*    (2006.01)
*B05D 1/00*    (2006.01)

(52) U.S. Cl. .............. 428/292.1; 428/293.1; 428/293.4; 428/294.4; 428/113; 427/206

(58) Field of Classification Search ............... 428/292.1
See application file for complete search history.

(56) References Cited

U.S. PATENT DOCUMENTS

| 5,934,648 | A | 8/1999 | Rivers et al. ................. 251/368 |
| 5,939,216 | A * | 8/1999 | Kameda et al. .............. 428/698 |
| 6,051,313 | A | 4/2000 | Olry et al. .................... 428/371 |
| 6,228,786 | B1 | 5/2001 | Olry et al. .................... 438/294 |
| 6,368,663 | B1 | 4/2002 | Nakamura et al. ........ 427/248.1 |
| 6,723,382 | B2 * | 4/2004 | Yamaguchi et al. ...... 427/249.2 |
| 6,838,162 | B1 | 1/2005 | Gruber et al. |

(Continued)

FOREIGN PATENT DOCUMENTS

CN    1288874    9/2000

(Continued)

OTHER PUBLICATIONS

Office Action issued Nov. 30, 2007 in corresponding Chinese Application No. 200480039952.9 and an English translation.

(Continued)

*Primary Examiner*—D. L Tarazano
*Assistant Examiner*—Camie S Thompson
(74) *Attorney, Agent, or Firm*—Ostrolenk Faber LLP

(57) ABSTRACT

A composite material according to the present invention includes: a fiber fabric (2) composed of certain fibers; and a matrix (3) which is so formed as to adhere to the fiber fabric (2). The fiber fabric (2) contains main constitutional fibers (21) and auxiliary fibers (22) which compensate the characteristics of the main constitutional fibers (21) when they are exposed to a high temperature atmosphere.

16 Claims, 5 Drawing Sheets

U.S. PATENT DOCUMENTS

| | | | |
|---|---|---|---|
| 2001/0008067 A1 | 7/2001 | Liebig | ............. 60/39.02 |
| 2003/0008067 A1 | 1/2003 | Yamaguchi et al. | |

FOREIGN PATENT DOCUMENTS

| | | |
|---|---|---|
| DE | 41 18 521 | 12/1992 |
| EP | 0 721 835 | 7/1996 |
| EP | 0 828 874 | 3/1998 |
| EP | 1 277 716 A1 | 1/2003 |
| JP | 63-012671 | 1/1988 |
| JP | 10-194856 | 7/1998 |
| JP | P2000-219576 | 8/2000 |
| JP | 2000-272040 | * 10/2000 |
| JP | 2003-20287 | 1/2003 |
| JP | P2003-20287 | 1/2003 |

OTHER PUBLICATIONS

International Search Report PCT/JP2004/019518 dated Mar. 29, 2005.

European Search Report dated Oct. 6, 2009 corresponding to European Patent Application No. 04807873.7.

* cited by examiner

「T-300/SiC」

「ZMI+(T-300)/SiC」

COMPOSITE MATERIAL AND PRODUCING METHOD THEREFOR

CROSS REFERENCE TO RELATED APPLICATION

The present application is a 35 U.S.C. §371 national phase conversion of PCT/JP2004/019518 filed Dec. 27, 2004, which claims priority of Japanese Application No. P2004-002904 filed Jan. 8, 2004, which are incorporated by reference. The PCT International Application was published in the Japanese language.

TECHNICAL FIELD

The present invention relates to a composite material and to a producing method therefor.

BACKGROUND OF THE INVENTION

Conventionally, a ceramic based composite material (i.e., a composite material) is known that is formed by adhering a matrix phase that is formed from silicon carbide onto a fiber fabric that is formed from silicon carbide. This type of ceramic based composite material (referred to below as SiC/SiC) is lightweight and has a high level of thermostability that is used as a formative material for rocket injection nozzles and the like. As is disclosed in Japanese Unexamined Patent Application, First Publication No. 2000-219576, the matrix phase in this SiC/SiC is formed by performing a combination of chemical vapor infiltration (CVI) and polymer infiltration and pyrolysis (PIP) on the surface of the heated fiber fabric.

DETAILED DESCRIPTION OF THE INVENTION

Problems to be Solved by the Invention

Although silicon carbide has excellent thermal stability, it also has the feature that, in a high temperature atmosphere, its strength deteriorates. Accordingly, in a high temperature atmosphere, SiC/SiC, which has a matrix phase formed from silicon carbide and a fiber fabric formed from silicon carbide, also suffers a loss of strength. Specifically, in a temperature atmosphere of approximately 1400° C., the strength of the SiC/SiC drops to approximately half the strength thereof at room temperature. Because of this, in a state in which it is constantly exposed to a high temperature atmosphere, SiC/SiC has the problem of insufficient strength. One method of solving this type of problem is to remove impurities such as oxygen in the silicon carbide fibers. According to this method, it is possible to inhibit the loss of strength of the silicon carbide in a high temperature atmosphere, however, if impurities such as oxygen in the silicon carbide fibers are removed, the silicon carbide fibers become fragile and the problem arises that they are easily broken during fabric formation. Moreover, the processing to remove impurities such as oxygen from the silicon carbide fibers entails high processing costs.

A ceramic based composite material also exists that uses fibers made from low cost carbon instead of the silicon carbide fibers (referred to below as C/SiC) and, in comparison with silicon carbide, has little loss of strength in a high temperature atmosphere. This C/SiC has greater strength than SiC/SiC in a high temperature atmosphere; however, because there is a difference in thermal elongation between the carbon fibers and the matrix which is formed from silicon carbide, in an environment where a heat cycle exists, a high residual stress acts on the matrix phase (in particular, on a high density phase that is formed using a CVI method) and there is a consequent possibility that the matrix phase will break. Furthermore, as is described above, because the matrix phase is adhered to the surface of the fiber fabric at a high temperature of approximately 1000° C., even after the matrix phase has been formed and then cooled residual stress still acts thereon and the problem of breaking of the matrix phase still exists.

The present invention was conceived in view of the above described circumstances, and it is an object thereof to improve the characteristics in a high temperature atmosphere and prevent breaking of the matrix phase.

SUMMARY OF THE INVENTION

In order to achieve the above described object, a composite material of the present invention includes a fiber fabric that is composed of certain fibers, and a matrix phase that is so formed as to adhere to the fiber fabric, wherein the fiber fabric includes: main constitutional fibers; and auxiliary fibers that compensate characteristics (e.g., loss of strength) when the main constitutional fibers are exposed to a high temperature atmosphere.

It is also possible to employ a structure in which the auxiliary fibers are included in the fiber fabric in such a proportion that residual stress that acts on the matrix phase and is caused by differences in thermal elongation between the fiber fabric and the matrix phase remains less than a breaking stress of the matrix phase.

It is also possible to employ a structure in which the auxiliary fibers are included in the fiber fabric in such a proportion that stress during use that acts on the matrix phase and is caused by differences in thermal elongation between the fiber fabric and the matrix phase remains less than a breaking stress of the matrix phase.

It is also possible to employ a structure in which the main constitutional fibers are formed from any one of silicon carbide, carbon, silicon nitride, silicon oxide, aluminum oxide, YAG, and a heat resistant metal.

It is also possible to employ a structure in which the auxiliary fibers have a different composition from that of the main constitutional fibers and are formed from any one of silicon carbide, carbon, silicon nitride, silicon oxide, aluminum oxide, YAG, and a heat resistant metal.

It is also possible to employ a structure in which the fiber fabric includes a plurality of different types of the auxiliary fibers that each have a different composition.

It is also possible to employ a structure in which the matrix phase is formed from any one of silicon carbide, carbon, zirconium carbide, silicon nitride, silicon oxide, aluminum oxide, zirconium oxide, hafnium oxide, YAG; and a heat resistant metal It is also possible to employ a structure in which there are provided a plurality of different types of the matrix phase that each have a different composition.

It is also possible to employ a structure in which when the main constitutional fibers are formed from silicon carbide, the auxiliary fibers are formed from carbon, and the matrix phase is formed from silicon carbide, a mixture proportion of the auxiliary fibers relative to the main constitutional fibers is less than 90%.

It is also possible to employ a structure in which the auxiliary fibers are included in a predetermined density distribution in the fiber fabric.

It is also possible to employ a structure in which a density distribution of the auxiliary fibers in the fiber fabric gradually changes in a plate thickness direction.

The producing method of a composite material of the present invention is a producing method of a composite material that is provided with a fiber fabric that is composed of certain fibers, and a matrix phase that is so formed as to adhere to the fiber fabric, that includes: a step in which are formed main constitutional fibers and auxiliary fibers that compensate characteristics when the main constitutional fibers are exposed to a high temperature atmosphere; and a step in which the matrix phase is adhered onto the fiber fabric.

It is also possible to employ a structure in which at least a portion of the matrix phase is formed by a CVI method Alternatively, it is also possible to employ a structure in which at least a portion of the matrix phase is formed by a PIP method.

Alternatively, it is also possible to employ a structure in which at least a portion of the matrix phase is formed by a slurry method.

Alternatively, it is also possible to employ a structure in which at least a portion of the matrix phase is formed by a reactive sintering method.

It is also possible to employ a structure in which the fiber fabric is formed after doubling by combining a bundle of the main constitutional fibers together with a bundle of the auxiliary fibers.

It is also possible to employ a structure in which the fiber fabric is formed after doubling by dispersing and then blending together the main constitutional fibers and the auxiliary fibers.

It is also possible to employ a structure in which the fiber fabric is formed by arranging the bundle of the main constitutional fibers and the bundle of the auxiliary fibers in predetermined proportions.

It is also possible to employ a structure in which the fiber fabric is formed by separating the bundle of the main constitutional fibers and the bundle of the auxiliary fibers into threads that have a predetermined thickness.

ADVANTAGEOUS EFFECTS OF THE INVENTION

According to the composite material and producing method thereof of the present invention, because auxiliary fibers that compensate characteristics relating to temperature changes in the main constitutional fibers, for example, characteristics when the main constitutional fibers are exposed to a high temperature atmosphere are included in the fiber fabric, it is possible to compensate the characteristics of the composite material in a high temperature atmosphere and prevent breaking of the matrix phase.

DESCRIPTION OF THE REFERENCE SYMBOLS

Figure 1:
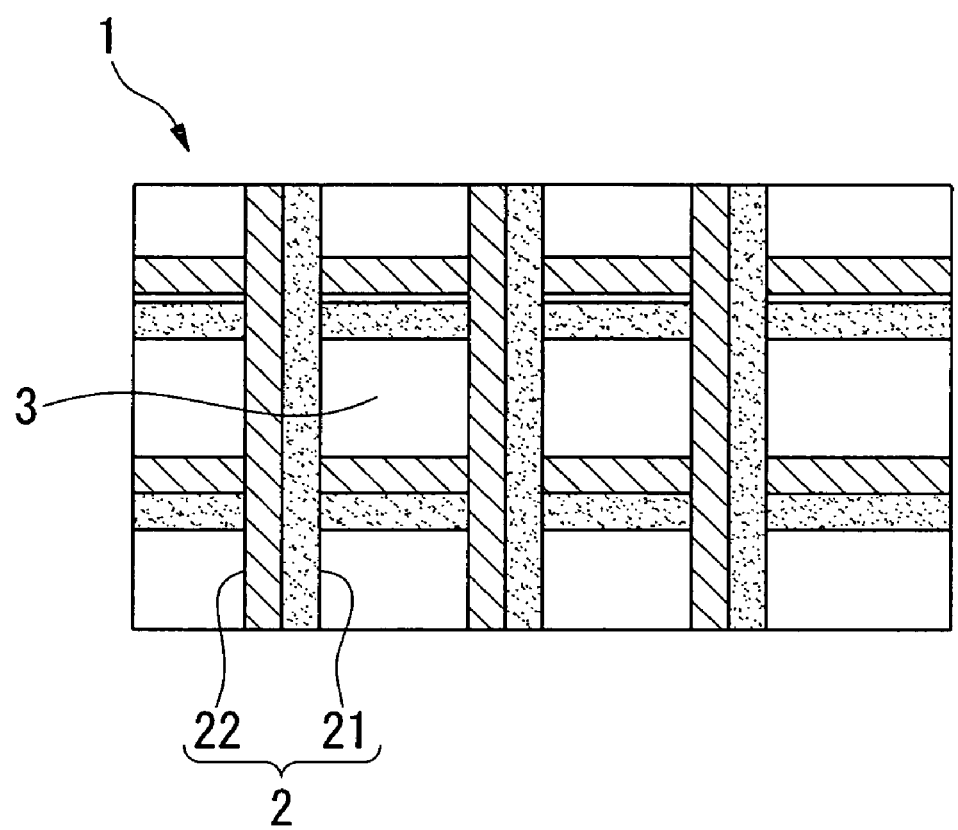
FIG. 1 is a schematic structural view showing an enlargement of a portion of a ceramic based composite material 1 according to an embodiment of the present invention.

1 . . . Ceramic based composite material (i.e., composite material) 2 . . . Fiber fabric 21 . . . Silicon carbide fibers (main constitutional fibers) 22 . . . Carbon fibers (auxiliary fibers) 3 . . . Matrix phase

BEST MODE FOR CARRYING OUT THE INVENTION

A description will now be given with reference made to drawings of an embodiment of a composite material and a producing method thereof according to the present invention. In the drawings, the scale of each component has been suitably altered in order to make each component a recognizable size.

DESCRIPTION OF A PREFERRED EMBODIMENT

FIG. 1 is a schematic structural view showing an enlargement of a portion of a ceramic based composite material 1 (i.e., a composite material) according to an embodiment of the present invention. In this drawing, a reference symbol 2 indicates a fiber fabric and a reference symbol 3 indicates a matrix phase.

The fiber fabric 2 is formed by bring together silicon carbide fibers 21 (i.e., a main constitutional fibers) and carbon fibers 22 (i.e., an auxiliary fibers), and then weaving them together three-dimensionally. These carbon fibers 22 are auxiliary fibers that compensate the strength loss (i.e., the characteristics) when the silicon carbide fibers 21 are exposed to a high temperature atmosphere, and are woven together with the fiber fabric 2 in such a proportion that the residual stress that are caused by the difference in thermal elongation between the fiber fabric 2 and the matrix phase 3 or the stress during its use acting on the matrix phase 3 do not exceed a breaking stress of the matrix phase 3. The breaking stress referred to here is a threshold value of the residual stress or stress during use that the matrix phase 3 is able to endure without breaking, and damage such as cracks and the like occur in the matrix phase 3 when stress equal to or greater than this breaking stress acts on the matrix phase 3.

The residual stress referred to here is a stress that acts on the matrix phase 3 when the ceramic based composite material 1 is moved from the high temperature atmosphere present during a formation of the matrix phase to a low temperature atmosphere, and is a stress that acts uniformly on different types of matrix phase 3. The stress during use is a stress acting on the matrix phase 3 that is caused by a distribution of temperature being generated inside the ceramic based composite material 1 and the like when the ceramic based composite material 1 is placed in a usage environment, and is a stress that has a different strength in each portion of the matrix phase 3. Generally, the stress of the matrix phase 3 during use is smaller than the residual stress. Because of this, it is preferable that the carbon fibers 22 are woven together with the fiber fabric 2 in such a proportion that the residual stress acting on the matrix phase 3 that is caused by the difference in thermal elongation between the fiber fabric 2 and the matrix phase 3 does not exceed the breaking stress of the matrix phase 3.

The matrix phase 3 is adhered onto the fiber fabric 2 and is formed from silicon carbide. This matrix phase 3 is formed by silicon carbide (referred to below as a CVI matrix) that is compactly formed around the fiber fabric 2, and by silicon carbide (referred to below as a PIP matrix) that has minute air holes that are formed on this compactly formed silicon carbide.

According to the ceramic based composite material 1 of the present embodiment that has the above described structure, because the carbon fibers 22 are included in the fiber fabric 2, even if the ceramic based composite material 1 is exposed to a high temperature atmosphere, it is still possible to inhibit the loss of strength in the ceramic based composite material 1.

Moreover, because these carbon fibers 22 are included in the fiber fabric 2 to an extent that the residual stress or stress during use that acts on the matrix phase 3 does not exceed the breaking stress of the matrix phase 3, during the formation or use of the ceramic based composite material 1 only a stress that does not exceed the breaking stress acts on the matrix phase 3. As a result, it is possible to prevent breaking of the matrix phase 3 that is caused by a difference in thermal elongation between the fiber fabric 2 and the matrix phase 3.

In the present embodiment, silicon carbide fibers that are formed from silicon carbide are used as the main constitutional fibers of the present invention; however, the present invention is not limited to this. For example, it is also possible to use main constitutional fibers that are formed from any of carbon, silicon nitride, silicon oxide, aluminum oxide, yttrium aluminum garnet (YAG), and a heat resistant metal.

Moreover, in the present embodiment, carbon fibers that is formed from carbon are used as the auxiliary fibers of the present invention; however, the present invention is not limited to this. For example, it is also possible to use auxiliary fibers that are formed from any one of silicon carbide, carbon, silicon nitride, silicon oxide, aluminum oxide, YAG, and a heat resistant metal that have a different composition from that of the main constitutional fibers. It is not necessary that only one type of auxiliary fiber be used and it is also possible to use a plurality of types of auxiliary fiber.

Furthermore, in the present embodiment, a matrix phase that is formed from silicon carbide is used as the matrix phase of the present invention; however, the present invention is not limited to this. For example, it is also possible to use a matrix phase that is formed from any one of carbon, zirconium carbide, silicon nitride, silicon oxide, aluminum oxide, zirconium oxide, hafnium oxide, YAG, and a heat resistant metal.

It is not necessary that only one type of matrix phase be used and it is also possible to use a plurality of types of matrix phase.

Next, results of a simulation of the ceramic based composite material 1 of the present embodiment will be described with reference made to Table 1 and the graphs in FIGS. 2 and 3. In Table 1, the carbon fiber ratio is the proportion of the carbon fibers 22 that are included when the total amount of the fiber fabric 2 is taken as 1. The volume proportion is the proportion of the fiber fabric 2 that is included when the ceramic based composite material 1 is taken as 1. The strength CVI shows the strength of the CVI matrix, and the strength PIP shows the strength of the PIP matrix. The volume proportion CVI is the proportion of the CVI matrix that is included when the ceramic based composite material 1 is taken as 1. The volume proportion PIP is the proportion of the PIP matrix that is included when the ceramic based composite material 1 is taken as 1. The CVI residual stress is the residual stress that acts on the CVI matrix when the ceramic based composite material 1 is cooled from 1000° C. to room temperature (i.e., 23° C.). The PIP residual stress is the residual stress that acts on the PIP matrix when the ceramic based composite material 1 is cooled from 1000° C. to room temperature. In this simulation, Tyranno (registered trademark) ZMI fibers manufactured by Ube Industries, Ltd. are used for the silicon carbide fibers 21, and T-300 manufactured by Toray are used for the carbon fibers 22.

TABLE 1

| Carbon fiber ratio | Volume proportion | Strength CVI (GPa) | Strength PIP (GPa) | Volume proportion CVI | Volume proportion PIP | CVI residual stress (GPa) | PIP residual stress (GPa) |
|---|---|---|---|---|---|---|---|
| 0.1 | 0.4 | 0.8 | 0.2 | 0.22 | 0.22 | 0.09 | 0.01 |
| 0.2 | 0.4 | 0.8 | 0.2 | 0.22 | 0.22 | 0.19 | 0.01 |
| 0.3 | 0.4 | 0.8 | 0.2 | 0.22 | 0.22 | 0.28 | 0.02 |
| 0.4 | 0.4 | 0.8 | 0.2 | 0.22 | 0.22 | 0.37 | 0.03 |
| 0.5 | 0.4 | 0.8 | 0.2 | 0.22 | 0.22 | 0.46 | 0.03 |
| 0.6 | 0.4 | 0.8 | 0.2 | 0.22 | 0.22 | 0.55 | 0.04 |
| 0.7 | 0.4 | 0.8 | 0.2 | 0.22 | 0.22 | 0.63 | 0.05 |
| 0.8 | 0.4 | 0.8 | 0.2 | 0.22 | 0.22 | 0.72 | 0.05 |
| 0.9 | 0.4 | 0.8 | 0.2 | 0.22 | 0.22 | 0.80 | 0.06 |
| 1 | 0.4 | 0.8 | 0.2 | 0.22 | 0.22 | 0.89 | 0.07 |

As is shown in Table 1, irrespective of the carbon fiber ratio, the volume proportion of the fiber fabric 2 was set to 0.4. In this case, the strength CVI (namely, the breaking residual stress of the CVI matrix) was 0.8 GPa, and the strength PIP (namely, the breaking residual stress of the PIP matrix) was 0.2 GPa. In addition, the volume proportion CVI and the volume proportion PIP were set to 0.22 irrespective of the carbon fiber ratio.

As is shown in Table 1, as the carbon fiber ratio increases from 0.1 to 1, the CVI residual stress changes from 0.09 GPa to 0.89 GPa and the PIP residual stress changes from 0.01 GPa to 0.07 GPa. The reason why the CVI residual stress is higher than the PIP residual stress is because the CVI matrix is more compact than the PIP matrix so that it has a greater elasticity as a matrix.

When the carbon fiber ratio is 0.9 and 1.0 (i.e., when the fiber fabric is formed solely of carbon fibers), the CVI residual stress exceeds 0.8 GPa which is the CVI strength.

Accordingly, it was found that when the carbon fiber ratio was 0.9 and 1.0, then the matrix phase 3 was broken by residual stress. Namely, it was found from Table 1 that when the carbon fiber ratio was less than 0.9, then the matrix phase 3 was not broken. Accordingly, when the main constitutional fibers are formed from silicon carbide, the auxiliary fibers are formed from carbon, and the matrix phase is formed from silicon carbide, then it is found to be preferable that the compound ratio of the auxiliary fibers to the main constitutional fibers is less than 90%.

Figure 2:
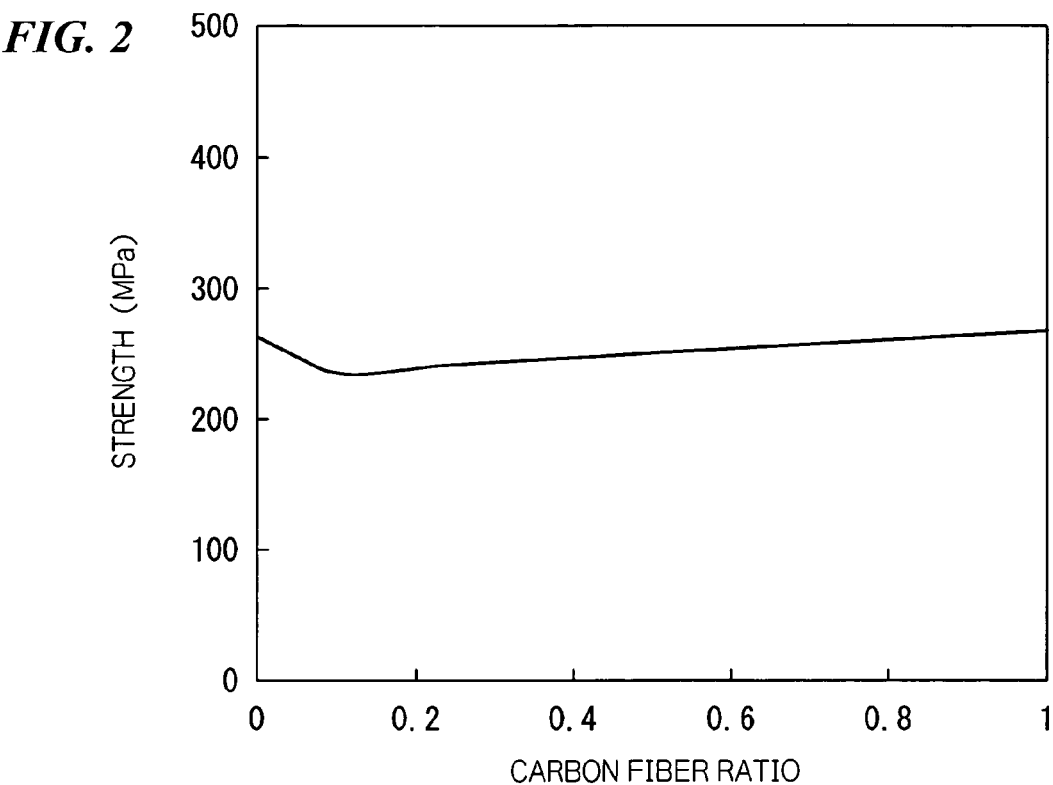
FIG. 2 is a view showing simulation results of the ceramic based composite material 1 according to the embodiment of the present invention.
Figure 3:
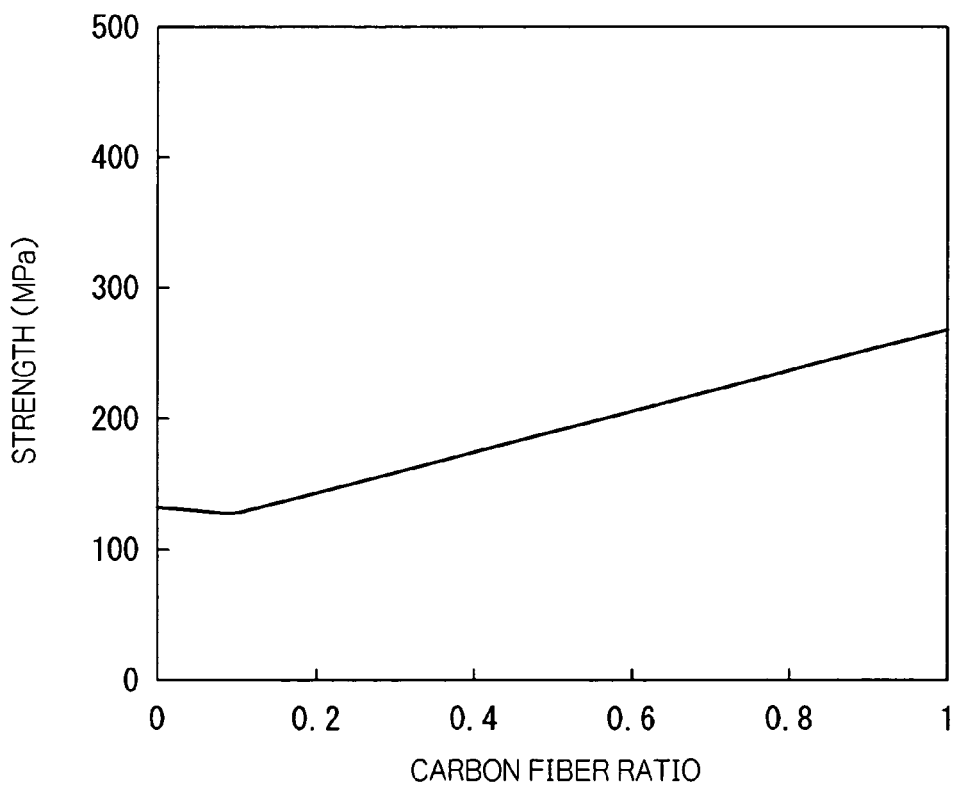
FIG. 3 is a view showing simulation results of the ceramic based composite material 1 according to the embodiment of the present invention.

FIGS. 2 and 3 show how the strength of the ceramic based composite material 1 changes in response to changes in the carbon fiber ratio. The horizontal axis shows the carbon fiber ratio while the vertical axis shows the strength of the ceramic based composite material 1. FIG. 2 shows the strength of the ceramic based composite material 1 at room temperature (i.e., 23° C.), while FIG. 3 shows the strength of the ceramic based composite material 1 at 1600° C. (i.e., in a high temperature atmosphere).

As is shown in FIG. 2, at room temperature, the strength of the ceramic based composite material 1 shows substantially no change relative to the carbon fiber ratio and is approximately 250 MPa. This is because the ZMI, which forms the silicon carbide fibers 21, and the T-300, which forms the carbon fibers 22, have substantially the same strength at room temperature. Accordingly, if, for example, fibers that are stronger than the T-300 (for example, the T-1000) are used for the carbon fibers 22, then the strength of the ceramic based composite material 1 increases as the carbon fiber ratio increases.

In comparison with this, as is shown in FIG. 3, at 1600° C., the strength of the ceramic based composite material 1 increases as the carbon fiber ratio increases. This is because a large quantity of the carbon fibers 22 that have little loss of strength are included in the fiber fabric 2 in a high temperature atmosphere as well so that it is possible to inhibit the loss of strength of the ceramic based composite material 1.

From Table 1 and FIGS. 2 and 3, it can be understood that, in the present embodiment, in order to inhibit the loss of strength of the ceramic based composite material 1 in a high temperature atmosphere and prevent the matrix phase 3 from breaking, it is preferable for the carbon fiber ratio in the fiber fabric 2 to be approximately 0.7.

Figure 4:
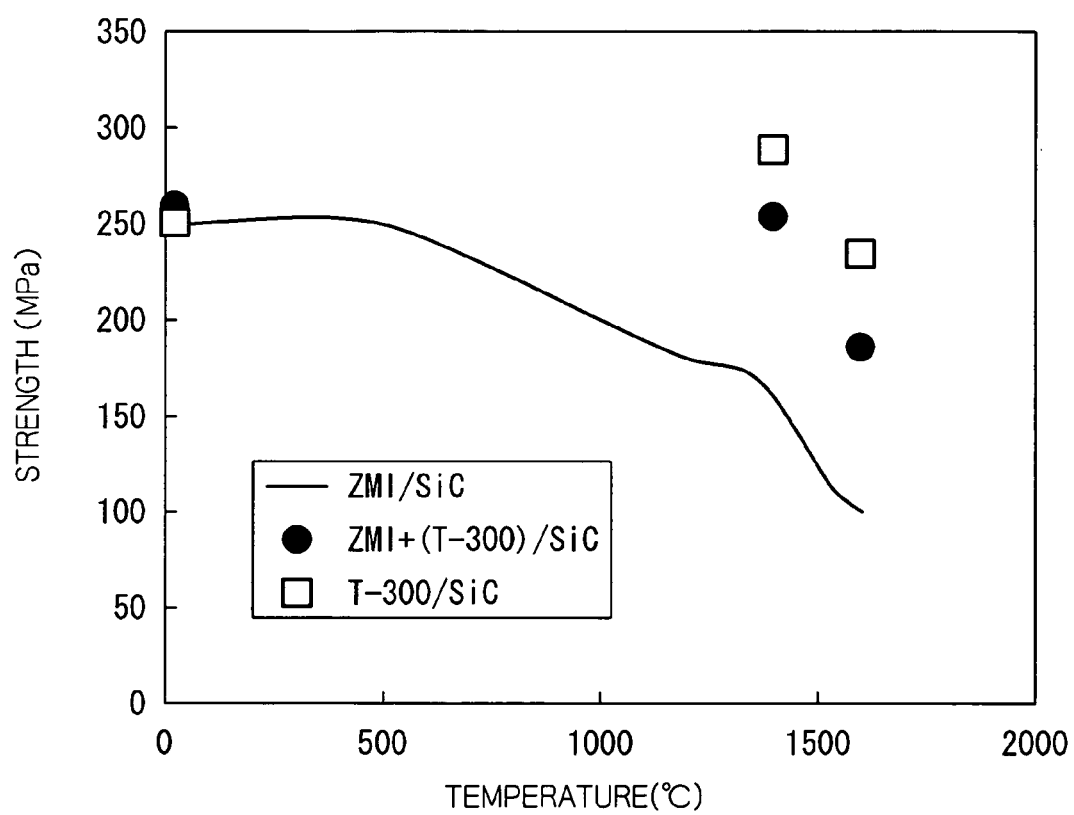
FIG. 4 is a view showing experiment data of the ceramic based composite material 1 according to the embodiment of the present invention.

Table 2 and FIG. 4 show experimental data supporting the above described simulations. Table 2 shows actual measured values, while FIG. 4 shows the actual measured values from Table 2 in graph form. The [ZMI+(T-300)/SiC] (with a carbon fiber ratio of 0.5) shown in Table 2 and FIG. 4 is the ceramic based composite material according to the present embodiment, while the [ZMI/SiC] is a ceramic based composite material in which the fiber fabric is formed solely from silicon carbide. In Table 2 and FIG. 4, in order to provide a comparative reference, the strength of a ceramic based composite material (T-300/SiC) in which the fiber fabric is formed solely from carbon is also shown.

As is shown in this table and graph, the strength of the [ZMI/SiC] is decreased from 250 MPa to 100 MPa as a result of it transitioning from room temperature (23° C.) to a high temperature atmosphere (1600° C.), while the strength of the [ZMI+(T-300)/SiC] having a carbon fiber ratio of 0.5 changes from 260 MPa to 186 MPa under the same conditions. Moreover, under the same conditions, the strength of the [T-300/SiC] changes from 252 MPa to 235 MPa.

Accordingly, from this experimental data, it can be confirmed that, as in the above described simulation, the loss of strength in a high temperature atmosphere of the ceramic based composite material according to the present embodiment is inhibited.

TABLE 2

| Temperature | ZMI/SiC | ZMI + (T-300)/SiC | T-300/SiC |
|---|---|---|---|
| 23 | 250 | 260 | 252 |
| 500 | 250 | | |
| 1000 | 200 | | |
| 1200 | 180 | | |
| 1371 | 168 | | |
| 1400 | | 254 | 288 |
| 1537 | 112.5 | | |
| 1600 | 100 | 186 | 235 |

Figure 5A:
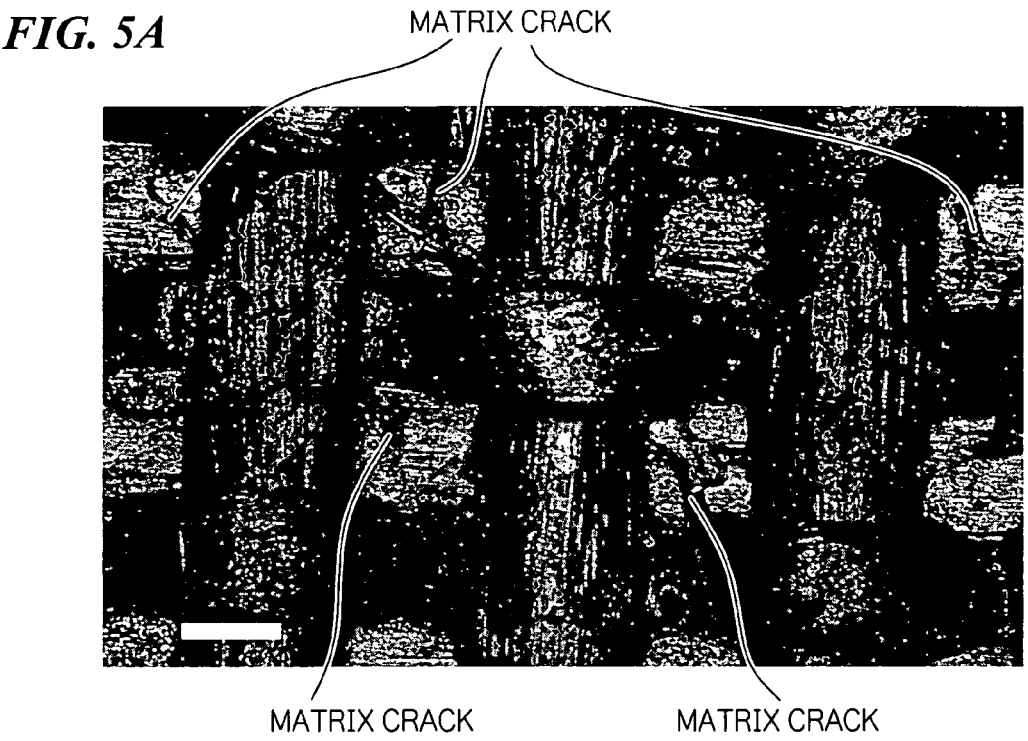
FIG. 5A is a view showing experiment data of the ceramic based composite material 1 according to the embodiment of the present invention.
Figure 5B:
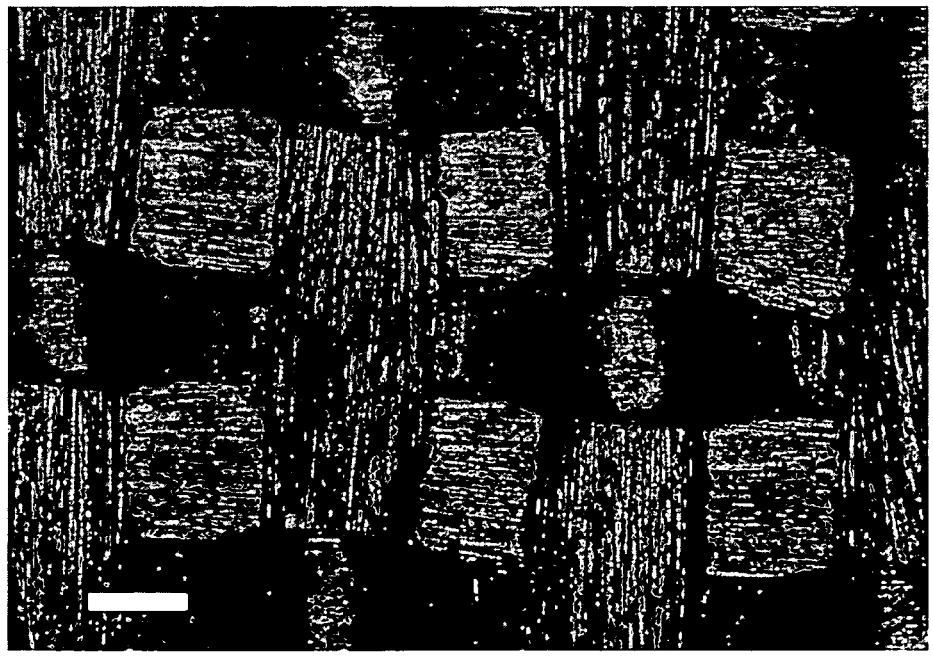
FIG. 5B is a view showing experiment data of the ceramic based composite material 1 according to the embodiment of the present invention.

The photographs shown in FIGS. 5A and 5B are enlargements of a matrix phase when the ceramic based composite material has been restored from a high temperature atmosphere to room temperature. FIG. 5A is an enlargement of the matrix phase of the [T-300/SiC] while FIG. 5B is an enlargement of the matrix phase of the [ZMI+(T-300)/SiC] ceramic based composite material according to the present embodiment. As is shown in these photographs, while matrix cracks can be confirmed in the matrix phase of the [T-300/SiC], no matrix cracks can be confirmed in the matrix phase of the ceramic based composite material according to the present embodiment. From this, it was confirmed that breaking of the matrix phase can be prevented in the ceramic based composite material according to the present embodiment.

Next, a producing method of the ceramic based composite material 1 according to the present embodiment will be described with reference made to the flow chart in FIG. 6.

Figure 6:
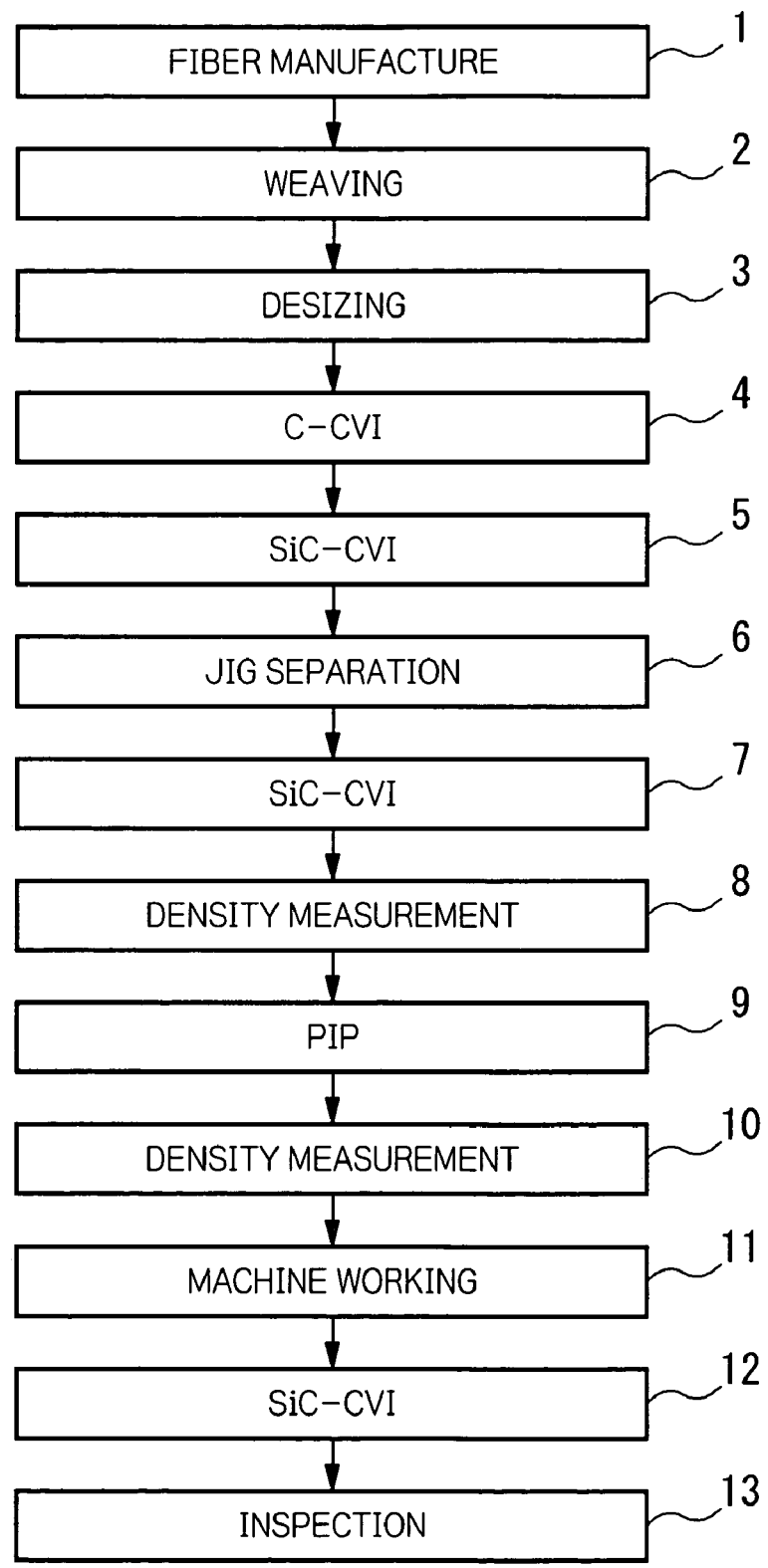
FIG. 6 is a flowchart showing a producing method of the ceramic based composite material 1 according to the embodiment of the present invention.

As is shown in FIG. 6, the producing method of the ceramic based composite material 1 according to the present embodiment is used as a portion of the respective steps of fiber manufacture 1, weaving 2, desizing 3, C-CVI 4, SiC-CVI 5, jig separation 6, SiC-CVI 7, density measurement 8, PIP 9, density measurement 10, machine working 11, SiC-CVI 12, and inspection 13. Note that it is also possible for some steps such as jig separation 6 and SiC-CVI 7 to be omitted.

In the fiber manufacturing step 1 and the weaving step 2, the fiber fabric 2 is formed by forming the silicon carbide fibers 21 and the carbon fibers 22 into a predetermined shape in predetermined proportions. Specifically, the fiber fabric 2 may be formed after, for example, combining a fiber bundle that is composed of 300 silicon carbide fibers 21 bundled together with a fiber bundle that is composed of 700 carbon fibers 22 bundled together to form a strand. Alternatively, the fiber fabric 2 may be formed after, for example, dispersing and then blending together fibers in a proportion of 300 silicon carbide fibers 21 to 700 carbon fibers 22. The shape that is created in the weaving step 2 may be, for example, a three-dimensional shape that is suitable for an injection nozzle of a rocket engine or the like to which the ceramic based composite material 1 is applied. It is also possible for a further step to be performed in which the material obtained by doubling fibers together in the manner described above is separated into threads of a predetermined thickness.

In the desizing step 3, excess polymer that has been coated onto the fiber fabric 2 is removed. In the machine working step 11, machine working and surface grinding are performed on the ceramic based composite material 1 that has been completed by undergoing hybrid processing achieved by combining chemical vapor infiltration (CVI) processing and polymer infiltration and pyrolysis (PIP) processing resulting in the desired component being produced. In this step, the component can be processed into a predetermined shape using, for example, a diamond grinding wheel.

The principal step of the present embodiment is the aforementioned hybrid processing, namely, the CVI processing in a depressurized atmosphere to form a silicon carbide matrix phase on the surface of the fiber fabric 2 that has been formed, and the PIP processing to impregnate the gaps in the formed matrix phase with an organic silicon polymer as a base material and then bake the resulting material.

The CVI processing is made up of the C-CVI step 4 and three SiC-CVI steps 5, 7, and 12. The C-CVI step 4 is a step in which carbon (preferably graphite carbon) or BN or the like is coated onto the formed fiber fabric 2. The coating thickness may preferably be approximately 0.1 to 1.0 μm. In this C-CVI step 4, it is also possible for the carbon or BN or the like to be coated only on the silicon carbide fibers 21. As is disclosed in Japanese Unexamined Patent Application, First Publication No. S63-12671, this coating phase performs the role of separating the matrix phase 3 and the silicon carbide fibers 21 and strengthening the toughness of the silicon carbide fibers 21.

The SiC-CVI steps 5, 7, and 12 are steps performed using what is known as a CVI method (i.e., vapor phase impregnation). In these steps, the fiber fabric 2 that has been fixed onto a dedicated jig inside a furnace is heated, the atmosphere is then depressurized and, for example, methyltrichlorosilane is introduced, so that the aforementioned CVI matrix is synthesized. Of the two processings, the first steps 5 and 7 may be repeated if necessary so that the volume ratio of the matrix synthesized in the CVI processing is between approximately 5% and approximately 80%. The last step 12 is a step to form a dense matrix on the surface of the PIP matrix that has been formed by PIP processing. The step 12 is not essential and may be omitted in some cases.

The PIP processing 9 is a step that is performed using what is known as a PIP method (i.e., liquid phase impregnation) and is made up of an impregnation step to impregnate the gaps in the matrix phase that was formed in the CVI processing with an organic silicon polymer as a base material, and baking step that is performed subsequently. The impregnation step and the baking step may be repeated if necessary. The organic silicon polymer that is used in the impregnation step may preferably be a polycarbosilane solution, polyvinylsilane, or polymethalocarbosilane or the like, or may preferably be a compound of these mixed with silicon carbide powder. By performing PIP processing by impregnating using these organic silicon polymers and then baking them, the PIP matrix can be formed in a short length of time.

Moreover, the impregnation in this PIP processing may preferably be achieved by performing any one of immersion, depressurized impregnation, pressurized impregnation, or by performing a combination of these. If immersion is performed, a large quantity of organic silicon polymer can be immersed in a short length of time. If depressurized impregnation is used, then extremely minute gaps can be impregnated with the organic silicon polymer. If pressurized impregnation is used, the airtightness can be improved by applying the pressure in the pressure direction during use and then performing the impregnation.

As a result of performing these CVI processing and PIP processing and the like, the matrix phase 3 is adhered on the fiber fabric 2, and the ceramic based composite material 1 according to the present embodiment is formed.

The density measurement steps 8 and 10 are steps to measure whether or not the density of the matrix phase 3 that has been formed in the respective steps immediately prior thereto is the desired density. The inspection step 13 is a step to inspect whether or not the completed ceramic based composite material 1 has the desired properties.

A preferred embodiment of the composite material and producing method thereof of the present invention is described above with reference made to the attached drawings; however, it should be understood that the present invention is not limited to this embodiment. The various configurations and combinations of the respective component elements described in the above embodiment are merely an example thereof and other modifications can be made based on the design requirements and the like without departing from the spirit or scope of the present invention.

For example, in the above described embodiment, the characteristic that was monitored when the main constitutional fibers were exposed to a high temperature atmosphere was the strength thereof. However, the present invention is not limited to this. For example, it is also possible for the characteristic that is monitored when the main constitutional fibers are exposed to a high temperature atmosphere to be the thermal conductivity or Young's modulus thereof. In this case, auxiliary fibers that compensate the respective characteristics are selected; however, whichever characteristic is chosen for monitoring, it is still possible to prevent breaking of the matrix phase.

In the above described embodiment, a description is given of when the density distribution of the auxiliary fibers in the ceramic based composite material 1 is constant. However, the present invention is not limited to this. For example, it is also possible to impart a bias to the density distribution of the auxiliary fibers in the ceramic based composite material 1.

For example, if the ceramic based composite material is used for an injection nozzle of a rocket engine or the like, then the configuration of the ceramic based composite material is set so as to match the configuration of the wall surface of the injection nozzle. In this case, the inner wall surface side (i.e., the side facing the center of the injection nozzle) of the ceramic based composite material is exposed to a higher temperature atmosphere, while the outer wall surface side of the ceramic based composite material is exposed to a lower temperature atmosphere than the inner wall surface side. Accordingly, it is preferable that the density distribution of the auxiliary fibers in the fiber fabric gradually increases approaching the inner wall surface side from the outer wall surface side, namely, gradually changes in the plate thickness direction.

In the above embodiment, the matrix phase 3 that is formed from silicon carbide is formed using a CVI method and a PIP method. However, the present invention is not limited to this. For example, the matrix phase may also be made using a slurry method or reaction sintering method. The slurry method is a method in which a slurry is created by mixing a powder in a solvent, and then heating this slurry so that a matrix phase is formed. Reaction sintering is a method in which a plurality of types of powder or powders and molten metals are reacted at a high temperature so that a matrix phase is formed.

Industrial Applicability

The characteristics of a composite material in a high temperature atmosphere are compensated and breaking of the matrix phase can be prevented.

The invention claimed is:
1. A composite material comprising:
a fiber fabric; and
a matrix phase formed of silicon carbide adhered to the fiber fabric, wherein the fiber fabric comprises:
main constitutional fibers formed of silicon carbide; and
auxiliary fibers formed of carbon, wherein the main constitutional fibers and the auxiliary fibers are stranded together such that the auxiliary fibers suppress differences in thermal elongation between the fiber fabric and the matrix phase under a high temperature atmosphere, and residual stress or stress during use, which acts on the matrix phase and is caused by the differences in thermal elongation, remains less than a breaking stress of the matrix phase, and the mixture proportion of the auxiliary fibers relative to the main constitutional fibers is less than 90%.

2. The composite material according to claim 1, wherein the auxiliary fibers are included in a predetermined density distribution in the fiber fabric.

3. The composite material according to claim 2, wherein the density distribution of the auxiliary fibers in the fiber fabric gradually changes in a plate thickness direction.

4. The composite material of claim 1, wherein the main constitutional fibers and auxiliary fibers are stranded together in strands.

5. A method of producing a composite material which comprises a fiber fabric including main constitutional fibers formed of silicon carbide and auxiliary fibers formed of carbon, and a matrix phase formed of silicon carbide and adhered to the fiber fabric, comprising the steps of:

forming the fiber fabric by stranding together the main constitutional fibers and the auxiliary fibers such that the auxiliary fibers suppress differences in thermal elongation between the fiber fabric and the matrix phase under a high temperature atmosphere, and residual stress or stress during use, which acts on the matrix phase and is caused by the differences in thermal elongation, remains less than a breaking stress of the matrix phase; and adhering the matrix phase onto the fiber fabric, wherein the mixture portion of the auxiliary fibers relative to the main constitutional fibers is less than 90%.

6. The method of producing a composite material according to claim 5, wherein at least a portion of the matrix phase is formed by a CVI method.

7. The method of producing a composite material according to claim 5, wherein at least a portion of the matrix phase is formed by a PIP method.

8. The method of producing a composite material according to claim 5, wherein at least a portion of the matrix phase is formed by a slurry method.

9. The method of producing a composite material according to claim 5, wherein at least a portion of the matrix phase is formed by a reactive sintering method.

10. The method of producing a composite material according to claim 5, wherein the fiber fabric is formed after combining a bundle of the main constitutional fibers together with a bundle of the auxiliary fibers so as to form a strand.

11. The method of producing a composite material according to claim 5, wherein the fiber fabric is formed after dispersing and then blending together the main constitutional fibers and the auxiliary fibers so as to form a strand.

12. The method of producing a composite material according to claim 5, wherein the fiber fabric is formed by arranging the bundle of the main constitutional fibers and the bundle of the auxiliary fibers in predetermined proportions.

13. The method of producing a composite material according to claim 5, wherein the fiber fabric is formed by separating the bundle of the main constitutional fibers and the bundle of the auxiliary fibers into threads that have a predetermined thickness.

14. The method of producing a composite material of claim 5, wherein stranding together of the main constitution of fibers and auxiliary fibers forms strands.

15. The composite material of claim 4, wherein a bundle of the main constitutional fibers is combined with a bundle of the auxiliary fibers in a strand.

16. The composite material of claim 4, wherein the main constitutional fibers and the auxiliary fibers are blended together in a strand.

* * * * *